United States Patent [19]

Nishikawa

[11] 4,345,661
[45] Aug. 24, 1982

[54] ANTI-ROLL SYSTEM FOR VEHICLES

[75] Inventor: Masao Nishikawa, Tokyo, Japan

[73] Assignee: Honda Giken Kogyo Kabushiki Kaisha, Tokyo, Japan

[21] Appl. No.: 190,865

[22] PCT Filed: Apr. 17, 1979

[86] PCT No.: PCT/JP79/00098
    § 371 Date: Feb. 8, 1980
    § 102(e) Date: Feb. 5, 1980

[87] PCT Pub. No.: WO80/00017
    PCT Pub. Date: Jan. 10, 1980

[30] Foreign Application Priority Data

Jun. 8, 1978 [JP] Japan .................. 53/69097

[51] Int. Cl.³ .......................... B60G 21/006
[52] U.S. Cl. .................. 180/141; 280/6 H; 280/112 A; 280/772
[58] Field of Search ............ 180/141, 142, 143, 132, 180/41; 280/112 A, 701, 772, 6.11, 5 H; 91/434

[56] References Cited

U.S. PATENT DOCUMENTS

| | | | |
|---|---|---|---|
| 2,893,751 | 7/1959 | Hagler | 180/132 |
| 3,396,984 | 11/1968 | Cadiou | 280/112 R |
| 3,608,925 | 9/1971 | Murphy | 280/112 A |
| 3,841,653 | 10/1974 | Strauff | 280/709 |
| 3,994,361 | 11/1976 | Nishikawa | 180/143 |

FOREIGN PATENT DOCUMENTS 36-21206 11/1961 Japan.

Primary Examiner—Joseph F. Peters, Jr.
Assistant Examiner—M. J. Hill
Attorney, Agent, or Firm—Irving M. Weiner; Pamela S. Burt; John L. Shortley

[57] ABSTRACT

An anti-roll system in a vehicle equipped with a power steering system for producing a steering reactive force modulatable by a speed at which the vehicle is running. The system introduces hydraulic pressure for the steering reactive force into suspension units on one side of the vehicle depending on steering directions, thereby preventing the roll of the vehicle body due to centrifugal forces exerted while the vehicle is being turned. An excessively inclined attitude of the vehicle during the turning thereof is thus corrected for an increased degree of maneuverability and safety of the vehicle.

8 Claims, 4 Drawing Figures

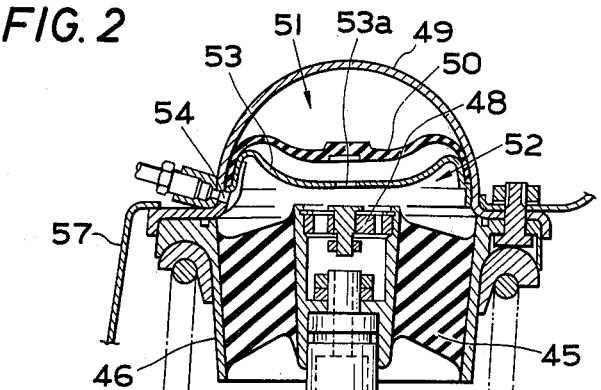
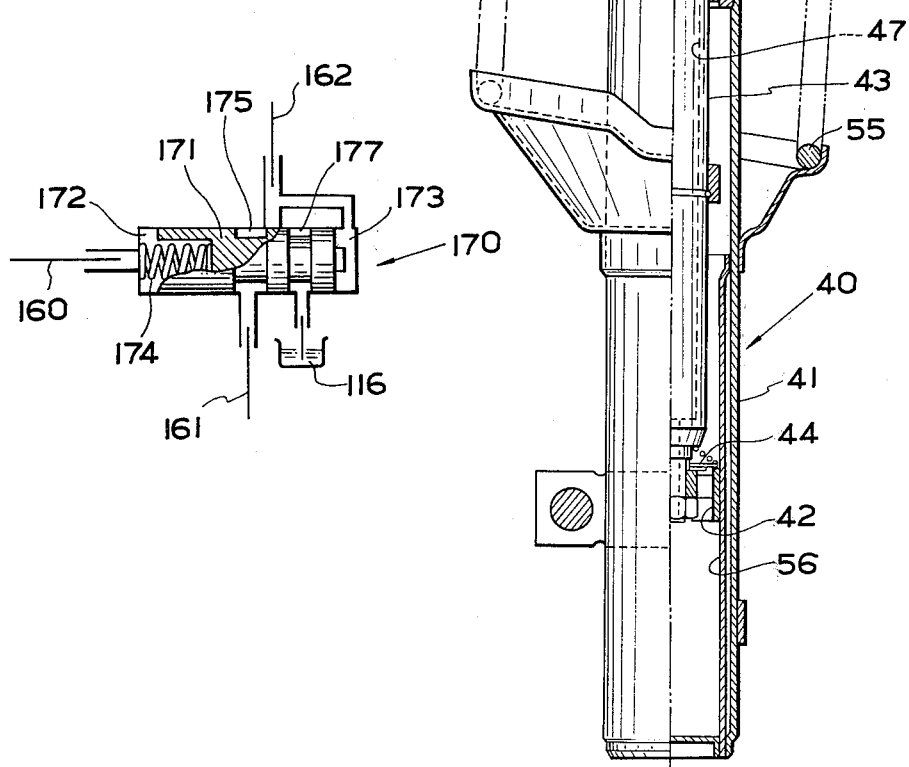

4,345,661

ANTI-ROLL SYSTEM FOR VEHICLES

TECHNICAL FIELD

The present invention relates to a system for preventing lateral inclination or roll of a vehicle body while the vehicle is being turned.

BACKGROUND ART

When a vehicle is steered so as to be turned by the driver, the vehicle is subjected to centrifugal forces tending to roll the vehicle body radially outwardly of a circular path of travel of the vehicle. Particularly, with modern passenger vehicles with soft suspension springs for increased comfort, the roll develops into a large angle due to the roll moment produced during the vehicle turning, and excessive lateral inclination of the vehicle is experienced, with the results that the driver and passengers will be subjected to discomfort during the turning, and maneuverability and driving safety will be reduced while the vehicle is being turned.

Various anti-roll means have been proposed for preventing a vehicle from rolling while it is being turned.

One such anti-roll means functions by detecting centrifugal forces, i.e., lateral G (acceleration due to gravity), exerted on the vehicle to control the attitude of the vehicle while it is being turned. This arrangement requires a complicated mechanism for detecting lateral G (centrifugal forces), which is more expensive and tends to generally be less reliable than other proposals, and hence is not commercially feasible.

Another proposed anti-roll means takes into consideration the fact that the lateral G is caused by the steering action. The means is arranged to detect the action of steering, instead of the lateral G resulting therefrom, with a view to controlling the vehicle attitude. A general form of such arrangement is disclosed in U.S. Pat. No. 2,893,751, and is advantageous in that it suffers from less phase delay than the prior lateral G detecting system and can be located almost anywhere, while the lateral G detecting system must be located adjacent to the center of gravity of the vehicle. However, this system is not practical mainly because the steering action is often contradictory to the produced lateral G. The greatest contradiction occurs when the steering action is conducted while the vehicle is at rest. That is, the input for steering the vehicle as well as the stroke of the steering wheel becomes maximum and control of the vehicle attitude is made by detecting same, even when the vehicle is at rest and thus no roll moment is produced.

There has been known a power steering system with a reaction chamber, a pressure restricting valve, and a car speed sensor for generating a steering reactive force modulatable by the vehicle speed. The power steering system of this type controls the hydraulic pressure in the pressure restricting valve and the reaction chamber depending on the vehicle speed and the resistance from the road surface to the turning of the steering wheel, thereby generating a corresponding degree of steering reactive force. Introduction of hydraulic pressure modulated and controlled by the vehicle speed for steering reactive force into the suspension units, simultaneous with the detection of steering action, can therefore prevent the vehicle from rolling.

DISCLOSURE OF INVENTION

In view of the problems with the conventional anti-roll systems and the advantages of the power steering system for producing steering reactive forces, the present invention provides an effective, proper and useful anti-roll system that is practically feasible.

An object of the present invention is to provide an anti-roll system in a vehicle equipped with a power steering system for producing a steering reactive force and means for modulating the steering reactive force by the vehicle speed, in which hydraulic pressure for the steering reactive force modulated and controlled by the vehicle speed is introduced into suspension units on either one side of the vehicle depending on a selected steering direction, thereby enabling the suspension units to be lifted or extended so as to prevent the vehicle attitude from being excessively inclined while it is being turned, thereby controlling the vehicle attitude.

According to the invention, since control over the vehicle attitude is carried out by detecting steering action which results in lateral G exerted on the vehicle, a loss of time can be saved for rapid and reliable prevention of the vehicle roll while the vehicle is being turned, in comparison with the prior art which controls the vehicle attitude by detecting lateral G.

With the device of the present invention, the hydraulic pressure to be introduced into the suspension units is controlled by various car speeds that are zero, low, medium, and high, for vehicle attitude control corresponding to the respective vehicle speeds. Thus, the difficulties with the prior steering action detecting systems are eliminated to obtain a truly effective and feasible anti-roll system for vehicles.

Further in accordance with the invention, the hydraulic pressure from a power steering system which is modulated by vehicle speeds is utilized, for detecting vehicle roll without requiring a technically precise and complicated mechanism which is required for detecting lateral G. Therefore, an anti-roll system of the present invention is inexpensive to manufacture, reliable in operation, and simple in structure, and allows itself and an associated power steering system to be operated without adversely affecting each other.

The above and other features, objects and advantages of the present invention will become apparent from the following detailed description taken with reference to the accompanying drawings which illustrate preferred embodiments by way of example.

BRIEF DESCRIPTION OF THE DRAWINGS

FIG. 2 is an enlarged, partly cross-sectional view of a suspension unit by way of example.

FIG. 4 is a view of an example of a proportional valve used in the embodiment of FIG. 3.

BEST MODE OF CARRYING OUT THE INVENTION

A power steering system has been known which allows the driver to sense different degrees of steering resistance depending on the speed at which the car is moving. As an example, U.S. Pat. No. 3,994,361 discloses a system wherein a pressure in a reaction chamber for producing a steering reactive force is not only proportional to the resistance from the road surface to the turning of the steering wheel, but also to the moving speed of the car. More specifically, when the steering wheel is to be turned while the car is at rest, the improved system according to the abovementioned U.S. patent causes the reaction chamber to build up a minimum amount of pressure because the speed at which the car is running is zero, thereby giving a reduced degree of resistance from the road surface to the turning of the steering wheel, i.e., a light steering. In contrast, systems prior to that of said U.S. patent used to cause a maximum amount of pressure to be built up in the reaction chamber, thus causing an increased degree of turning resistance, i.e., a heavy steering to be encountered. When the car is moving sufficiently fast, the pressure in the reaction chamber of the system according to said U.S. patent is controlled entirely in proportion to the resistance from the road surface to the turning of the steering wheel, and when the car speed is intermediate, the pressure in the reaction chamber has upper limits governed by the respective car speeds.

Since such power steering system attempts to produce a steering reactive force that is substantially proportional to a lateral G (centrifugal force) acting on the moving vehicle, the pressure in the reaction chamber is substantially equal to the lateral G. Therefore, the supply of the reaction chamber pressure or a slightly biased or changed pressure into the shock absorber of a right-hand side or left-hand side suspension unit, depending on steering directions, will enable the shock absorber to extend upon receiving the supply of pressure. The shock absorber will extend to such an extent as the effective cross-sectional area of the piston rod, so that the contracting movement of the suspension unit, located radially outwardly of a turning circle of the vehicle due to the centrifugal force, can be controlled for correcting an excessive slanting attitude of the vehicle.

Figure 1:
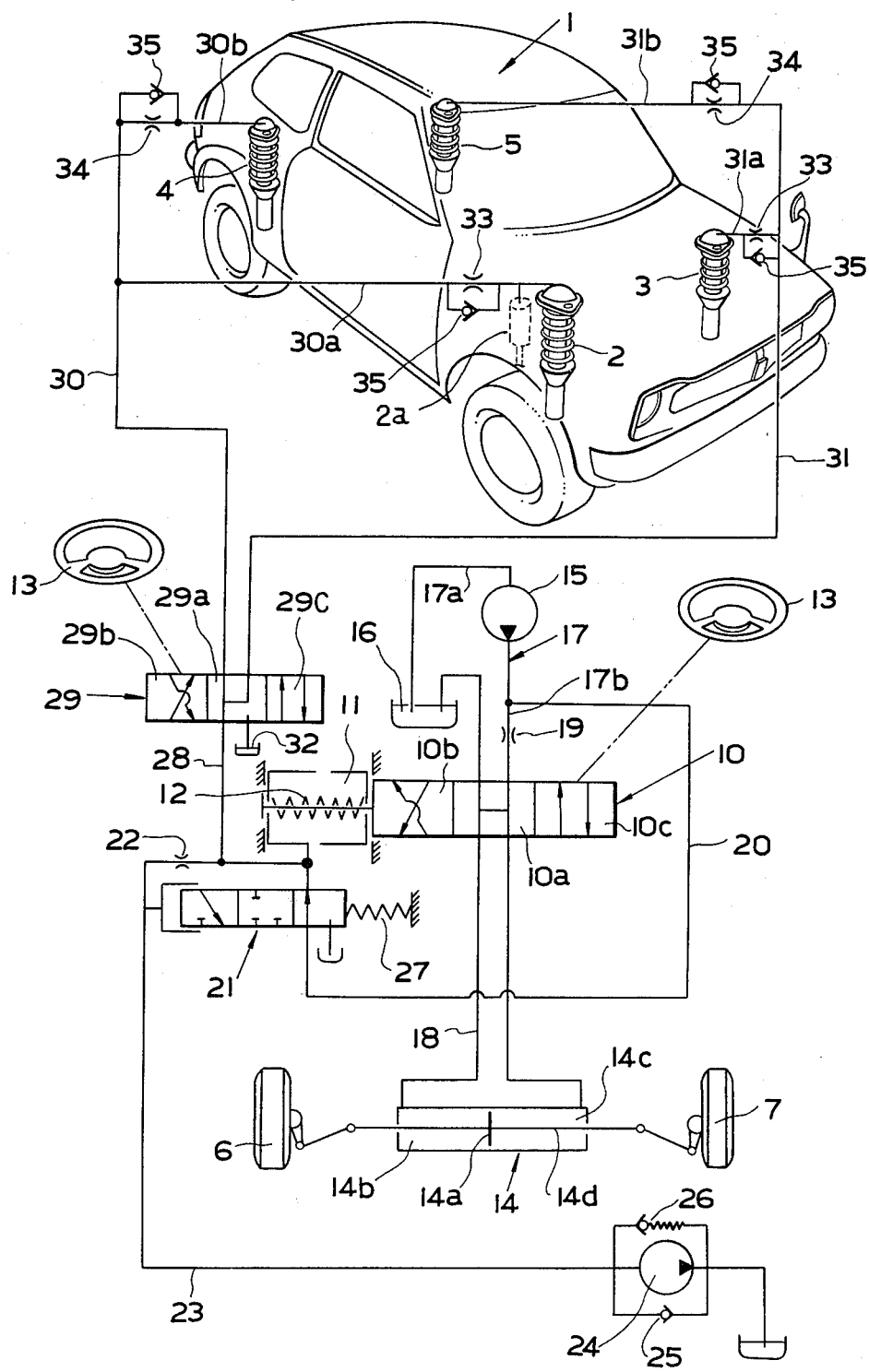
FIG. 1 is a view showing an embodiment of the present invention, the view being partly illustrated schematically.

FIG. 1 shows an embodiment incorporating the principles of the invention, the view being illustrative of a central part of the invention. The power steering device itself is of a known nature, and therefore its detailed description will be omitted.

A vehicle 1 is provided with a plurality of suspension units 2, 3, 4 and 5, including hydraulic shock absorbers, operatively associated with each of the vehicle wheels. Each unit 2-5 has one end thereof supported on the body of the vehicle and the other end on a corresponding one of the wheels.

Designated at 10 is a four-way directional control valve with a center valve position 10a and offset positions 10b, 10c, the valve being held in the center position, in the drawing, under the force of a return spring 12 in a reaction chamber 11 disposed adjacent to an axial end of the valve 10. The valve 10 can be switched by a steering wheel 13. A hydraulic cylinder 14 has chambers 14b, 14c separated by a piston 14a and selectively connected to an upstream source 15 of hydraulic pressure or an upstream reservoir 16, depending on the magnitude and direction of steering torque applied to the steering wheel 13 and its direction of rotation. This provides a desired degree of power assistance to turn steered wheels 6,7 which are coupled with respective ends of a rod 14d connected to the piston 14a.

A supply line 17 extends from the oil source 15 via the valve 10 to the cylinder 14 and a return line 18 extends from the cylinder 14 via the valve 10 to the reservoir 16. The oil source 15 is connected by a line 17a to the reservoir 16. In the illustrated center position of the valve 10, oil is returned freely, without being substantially throttled, from the engine-driven source 15 to the reservoir 16. Thus, the valve 10 is of the "open-center" type.

There is a mechanism available for mechanically coupling the steering wheel 13 with the steered wheels 6, 7 for controlling the latter by manipulating the steering wheel 13 at the time of malfunctioning of the oil source 15. However, no detailed description of such a mechanism will be made as it does not form a part of the present invention.

An orifice 19 is disposed in a line 17b extending between the oil source 15 and the four-way valve 10. A pressure upstream of the orifice 19 is introduced via a line 20 and a pressure restricting valve 21 into the reaction chamber 11. A line 23 with an orifice 22 extends from the reaction chamber 11 to the inlet of a hydraulic motor 24 rotatable at a speed controllable in proportion to the speed at which the vehicle is running. The number of revolutions of the hydraulic motor 24 can be controlled simply by causing a gear on the output shaft of the motor 24 to mesh with a gear on the countershaft of a transmission. A one-way valve 25 is provided to prevent a negative pressure in the line 23 when the hydraulic motor 24 is rotated at a rate greater than the rate of supply of oil thereinto, and a relief valve 26 is also provided to prevent an excessive pressure from being built up in the line 23 and the reaction chamber 11 when the motor 24 rotates in the reverse direction during rearward movement of the vehicle.

The pressure restricting valve 21 in the line 20 is so arranged that it may be shifted to the closed position by a pressure downstream of the orifice 22 and to the open position under the force of a spring 27.

The above-mentioned structure is already disclosed in U.S. Pat. No. 3,994,361.

In this arrangement, a branch line 28 extends from the line 23 from the reaction chamber 11 at a position upstream of the orifice 22. The line 28 is connected to a switching valve 29 which is shiftable to the right or left position from the center position in which the steering wheel 13 is held centrally. The oil in the reaction chamber 11 is selectively supplied to the suspension units through the valve 29. In other words, the valve 29 selectively connects the suspension units 2, 4 which are on the right-hand side as viewed in the forward direction of the vehicle 1 or the suspension units 3, 5 which are on the left-hand side as viewed in the same direction, to the reaction chamber 11 or a reservoir 32.

Extending from the valve 29 to the right-hand suspension units 2, 4 on the vehicle 1 is a line 30 having a pair of branch lines 30a, 30b for supplying pressurized oil into the units 2, 4, respectively. A line 31 also extends from the valve 29 to the left-hand suspension units 3, 5, and has pair of branch lines 31a, 31b for supplying pressurized oil into the units 3, 5, respectively. The oil pressure in the reaction chamber 11 is selectively supplied into one or the other of the lines 30, 31, the oil in the other line being returned into the reservoir 32, by manipulation into the reservoir 32, by manipulation of the steering wheel 13 to move the valve 29 to the position 29b or 29c. The branch lines 30a, 30b, and 31a, 31b of the lines 30, 31 for the suspension units 2–5, respectively, have different cross-sectional areas due to varied weight distributions on the suspension units 2–5. Orifices 33, 34 are therefore located upstream of the suspension units and comprise flow control mechanisms for controlling the flow in the branch lines and preventing the reactive force in the power steering device from being produced with a time lag. One-way valves 35 are disposed across the orifices 33, 34 so as to allow rapid withdrawal of the oil from the units. In the illustrated position, the valve 29 is located centrally while all of the suspension units 2-5 are supplied with the pressurized oil from the reaction chamber 11.

The switching valve 29 may be of any type, such as the solenoid-operated type, provided it can be responsive to the direction in which the steering wheel is rotated. Although the reaction chamber 11 is of the type which has two compartments for turning in the rightward and leftward directions, a pair of separate pressure restricting valves may be provided without the switching valve in order to direct the pressures in the reaction chamber compartments directly to the suspension units 2, 4, and 3, 5, respectively.

FIG. 2 illustrates an embodiment of the suspension unit as described above. The suspension unit is provided with a shock absorber 40 including a cylinder 41, a piston 42 slidably disposed therein, and a piston rod 43 connected to the piston 42. The piston 42 has a check valve 44 for producing a damping force on the extension stroke. The cylinder 41 is supported at a lower end portion on the side of a vehicle wheel by means of a knuckle (not shown). The piston rod 43 is supported at an upper end portion on a vehicle body 57 by a rubber mount 45 and a support member 46. The rod 43 is provided with a vertical passageway 47 therein, and a valve 48 located at an upper end portion of the passageway 47 for introducing an amount of oil displaced by downward movement of the piston 42 into an area that is upward of the rod, thereby generating a dampening force on the downward stroke. A semispherical cap 49 is disposed over the rod 43. The interior of the cap is divided by a resilient membrane 50 into upper and lower sealed chambers 51, 52, the upper chamber 51 being filled with a medium such as $N_2$ gas at a predetermined initial pressure. A partition 53 having a small-diameter aperture 53a is mounted in the lower chamber 52, and the chamber 51 is restricted in its maximum volume when the membrane 50 is in contact with the partition 53. The lower chamber 52 communicates via the valve 48 with the interior of the rod 43 and further communicates via a port 54 with the branch lines 30a, 30b, 31a, 31b to permit the pressurized oil in the reaction chamber 11 to be introduced through the port 54 into the lower chamber 52. Accordingly, the interior portions of the shock absorber 40, except the gas-filled chamber 51, are filled with the fluid led from the power steering device. Designated at 55 is a return spring and at 56 is a cylinder sleeve which secures sliding movements of the piston when the cylinder 41 is a monocylinder tending to be distorted or deformed due to bending stresses or collision with objects such as stones.

Operation of the device will be described hereinbelow.

In the following description it will be assumed that the engine is being operated, the source of oil pressure 15 continues to supply hydraulic oil, and the vehicle is at rest.

In the FIG. 1 position, the hydraulic oil is returned to the reservoir 16 due to the four-way valve 10 being in the central position 10a, and is circulated between the oil pressure source and the reservoir. At this time, the orifice 19 causes a pressure $\Delta P_1$ to be built up in the branch line 20 extending from the line 17 upstream of the orifice 19. However, the reaction chamber 11 is kept at a pressure $\Delta P_2$ which is lower than the pressure $\Delta P_1$ because the pressure restricting valve 21 is interposed in the line 20 upstream of the reaction chamber 11. The pressures $\Delta P_1$ and $\Delta P_2$ are very low, $\Delta P_1$ being 4 Kg/cm$^2$ and $\Delta P_2$ being 2 Kg/cm$^2$, for example.

When the steering wheel 13 is turned in the rightward or leftward direction, the valve 29 is shifted in a corresponding direction to the position 29b or 29c, selectively connecting the lines 30 and 31 to the line 28 and the reservoir 32, whereupon the suspension units 2, 4, for instance, are kept at the pressure $\Delta P_2$, and the suspension units 3, 5 are vented to atmosphere. Accordingly, the units 2, 4 and the units 3, 5 jointly permit a difference in force acting therebetween and equal to the product of $\Delta P_2$ multiplied by the cross-sectional area of the rod 43, thereby biasing the left-hand side of the vehicle body to be inclined downwardly. The amount of such inclination is very small and the vehicle body will not be substantially inclined since $\Delta P_2$ is small.

Operation of the device while the car is moving will be described hereinbelow.

The car-speed sensor 24 starts to rotate, and due to a pressure drop in the line 23, the pressure restricting valve 21 is shifted to the open position, whereupon the reaction chamber 11 is pressurized from $\Delta P_2$ to $\Delta P_1$ under the pressure in the line 20. The four suspension units 2-5 now are lifted slightly to a position which is considered to be a normal-height position of the car body. The car height while the car is at rest is thus a little lowered, which however is practically of no consequence.

While the car is moving, as the steering wheel 13 is turned in the rightward or leftward direction, the valve 29 is shifted from the FIG. 1 position to the rightward or leftward position. When the valve 29 is in the offset position 29c, for example, the line 30 is connected to the reaction chamber 11 and the line 31 is connected to the reservoir 32. Assuming that the suspension units 2, 4 connected to the line 30 are located on the radial outermost side of a circle of turning, the pressurized oil in the reaction chamber 11 is supplied into the suspension units 2, 4, and the oil pressure in the suspension units 3, 5 connected to the line 31 is drawn out, whereupon the outwardly located suspension units 2, 4 tending to be displaced downwardly due to centrifugal forces are lifted to suppress the tendency to be inclined downwardly at the outward side of the vehicle body. Accordingly, the tendency of the vehicle body to become excessively inclined due to the turning movement is restrained to prevent the roll of the vehicle. This is done by the oil pressure in the reaction chamber modulated in response to the speed at which the car is running, to act against centrifugal forces varying with the car speed.

With such an arrangement, rotation of the steering wheel 13 enables the valve 29 to select suspension units into which the pressurized oil from the reaction chamber 11 is to be supplied. The pressure restricting valve 21 remains open until the pressure in the reaction chamber 11 is sufficiently increased to force oil flow for the hydraulic motor 24 to pass through the orifice 22.

As the steering wheel 13 is turned further, the pressure in the reaction chamber 11 increases in proportion to the resistance from the road surface to the turning of the steering wheel, causing the oil flow passing through the orifice 22 to exceed an amount of oil that can be consumed by the motor 24, whereupon the pressure restricting valve 21 starts moving to the closed position in which the pressure in the reaction chamber 11 is maintained constantly even when the road surface resistance still continues to be increased. At this time, a pressure responsive to the car speed and to the angular movement of the steering wheel is supplied into the suspension units, opposing a rolling movement due to the lateral G (the centrifugal forces). While the car is running at a higher speed, the number of revolutions of the hydraulic motor 24 is large so that an oil pressure proportional to the road surface resistance is applied through the reaction chamber 11 to the suspension units so as to prevent outward roll effectively.

While in the illustrated embodiment the suspension units are employed as anti-roll actuators utilizing the pressure from the reaction chamber, hydraulic jacks 2A (shown in broken line in FIG. 1) comprising a cylinder and a piston disposed parallel to the suspension units may be used in place of the suspension units for the above-mentioned operation.

Figure 3:
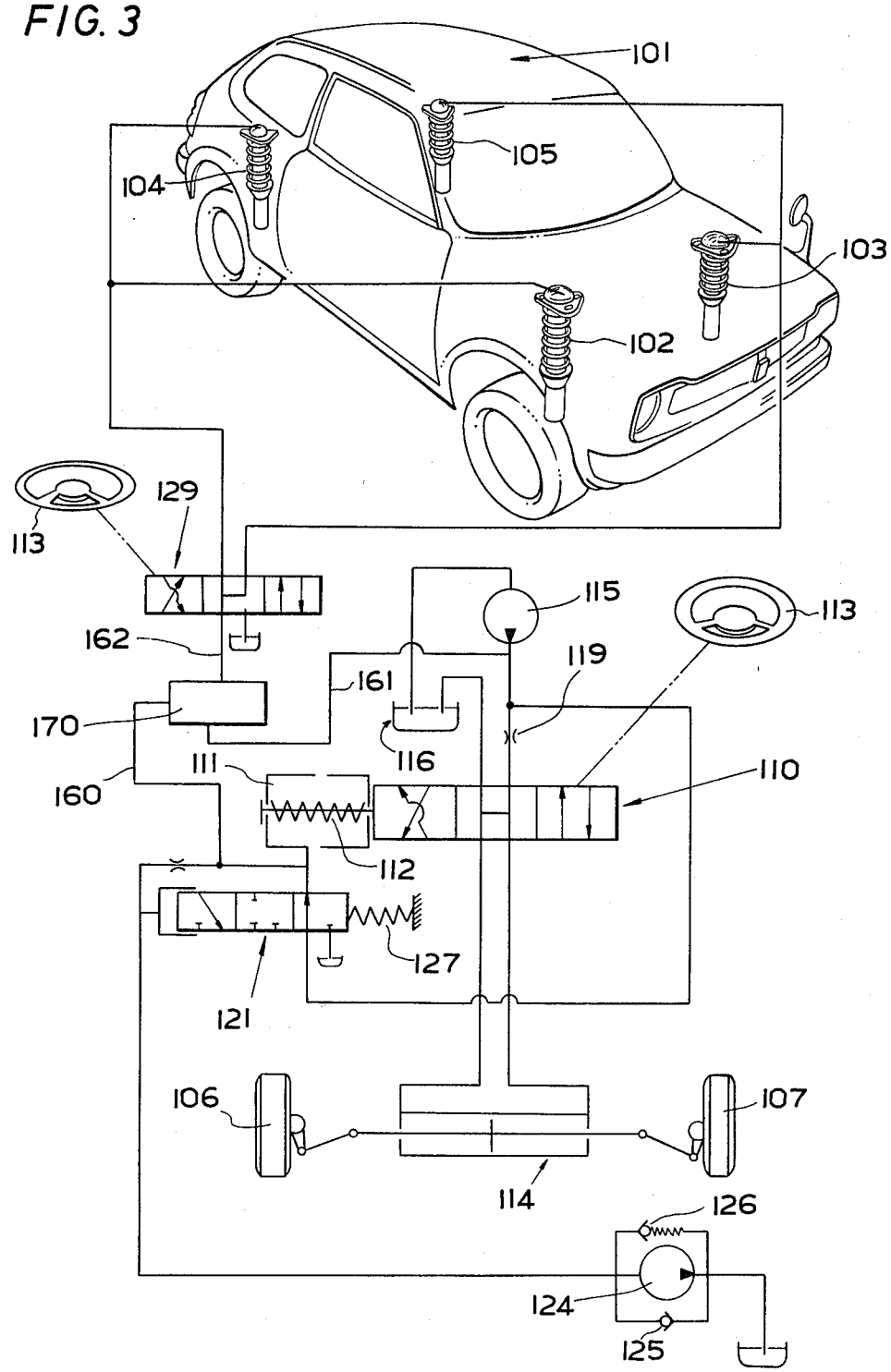
FIG. 3 is a view similar to FIG. 1, showing a modified embodiment of the invention.

FIG. 3 shows another embodiment of the present invention.

In the foregoing embodiment, since the pressurized fluid flows from the pressure restricting valve 21 to the right-hand side or left-hand side suspension units, the reaction chamber 11 is supplied with a pressure affected by dynamic pressure. This requires that the orifice 33 or 34 be sufficiently small in diameter, and there is a possibility that a "feel" of steering may interfere with roll control.

In the embodiment shown in FIGS. 3 and 4, provision is made for effectively carrying out roll control without sacrificing a "feel" of steering. The structure and operation of such embodiment will be described hereinbelow.

Parts having the same function as those mentioned with respect to the preceding embodiment are indicated by similar reference numbers with "1" added as prefixes, and detailed description will not be repeated.

In FIG. 3, a reaction pressure controlled by the pressure restricting valve 121 is introduced into the reaction chamber 111 and into a proportional valve 170 via a line 160. The proportional valve 170 supplies a portion of discharged fluid from the oil pressure source 115 into the suspension units 102, 103, 104, 105 via a line 161, such fluid portion being modulated by and proportional to the pressure in the reaction chamber 111. An example of the proportional valve 170 is shown in FIG. 4 and comprises a spool valve 171 slidably disposed in a cylinder which is divided by the valve 171 into a chamber 172 and a chamber 173. A spring 174 is disposed under compression in the chamber 172 to urge the valve 171 rightwardly. The oil pressure in the reaction chamber is introduced via the line 160 into the chamber 172. Thus, the force from the spring 174 and the oil pressure in the chamber 172 jointly force the valve 171 rightwardly to keep the lines 161 and 162 open. The pressure in the line 162 is supplied into the chamber 173 so as to act to block communication between the lines 161 and 162. The valve 171 has two annular grooves 175, 177 communicating respectively with the outlet of the pump and the reservoir 116. Disposed between the line 162 and the suspension units 102–105 is the switching valve 129 for performing a switching operation in reponse to turning movement of the steering wheel 113.

The proportional valve 171 is operated as follows. While the vehicle is at rest, the pressure built up by the orifice 119 is lowered by the pressure restricting valve 121 and is supplied into the chamber 172 in the proportional valve 171, and at the same time, the pressure led via the line 161 upstream of orifice 119 is introduced via the line 162 and into the chamber 173. In the illustrated embodiment, a pressure that is increased by the spring 174 is built up in the line 162. This relationship continues to exist as the pressure in the reaction chamber increases. It will be understood that the line 162 is kept at a pressure which is at all times higher than the pressure in the reaction chamber by the force of the spring 174, and the pressure in the line 162 is proportional to the pressure in the reaction chamber. The proportional constant can easily be changed by changing pressure-receiving areas at the ends of the valve 171 facing to the chambers 172, 173, such pressure-receiving areas in the illustrated embodiment having a ratio of 1:1. The valve 171 can be biased in the opposite direction or negative-biased by displacing the spring 174 from the chamber 172 to the chamber 173.

The proportional valve 170 allows the pressure in the reaction chamber to be used as a signal only and enables a fluid pressure in proportion to such signal pressure to be produced out of the effluent fluid flow from the oil pressure source 115 and to be supplied to the suspension units 102-105. Therefore, it is unnecessary to employ the orifices 33, 34 previously mentioned which tend to suffer from a delay of time, and a "feel" of steering is not adversely affected. Further, advantages of the open-center type valve can be retained. Since an increase in pressure in the line 160 is accompanied by an increase in pressure in the line 161, loss of energy can be kept to a minimum. The proportional valve is not limited to the type disclosed in the illustrated embodiment, but may be of other types such as an electrical nozzle flapper type.

INDUSTRIAL APPLICABILITY

The present invention utilizes a power steering system for producing a steering reactive force modulated in response to a speed at which the car is driving. Hydraulic pressure for generating the steering reactive force is introduced into damper means located on the car radially outwardly of a circle along which the car is turned, depending on a steering direction, thereby preventing the roll of the car body due to centrifugal forces exerted on the car body while the car is being turned. Thus, an increased degree of maneuverability and safety is attained while the car is being turned. Where the present invention is applied to suspension units on a passenger car with soft suspension, it can provide an excellent suspension system of the anti-roll type. Since the present invention utilizes a steering reactive force from a speed-responsive power steering system, anti-roll control according to the degree of centrifugal forces applied can be obtained without requiring a complicated mechanism, such as that required for detecting the lateral G. Accordingly, a high degree of anti-roll control is readily available.

I claim:

1. An anti-roll system for a vehicle equipped with a power steering system including a hydraulic pressure reaction chamber for producing a steering reactive force, and means for modulating said steering reactive force by the speed at which the vehicle is moving, said system comprising:

damper means having at least a cylinder and a piston, said damper means being disposed between the vehicle body and each of the vehicle wheels;

said damper means being in fluid communication with said hydraulic pressure reaction chamber in said power steering system;

means for selectively connecting said hydraulic pressure reaction chamber with those of said damper means disposed on either side of said vehicle in response to rotation of a steering wheel of said vehicle in a selected steering direction, said means being connected between said hydraulic pressure reaction chamber and said damper means; and the hydraulic pressure in said reaction chamber being introduced, while said vehicle is being turned, into said damper means disposed on the radial outermost side of a circle along which said vehicle is being turned, depending on said selected steering direction, so as to control the roll of the vehicle body.

2. An anti-roll system according to claim 1, wherein the hydraulic pressure in said reaction chamber is proportional to the resistance from the road surface to the turning of the steering wheel as well as to the speed at which the vehicle is moving.

3. An anti-roll system according to claim 1 or 2, wherein the hydraulic pressure in said reaction chamber is proportional to the angular movement of said steering wheel as well as to the speed at which the vehicle is moving.

4. An anti-roll system according to claim 1 or 2, wherein said damper means comprises shock absorbers in suspension units on the vehicle.

5. An anti-roll system according to claim 1 or 2, wherein said damper means comprises hydraulic jacks disposed parallel to suspension units on the vehicle.

6. An anti-roll system according to claim 1 or 2, wherein said system further includes a flow control mechanism disposed between said reaction chamber and said damper means, for preventing an increase in pressure in said reaction chamber from being built up with a time delay.

7. An anti-roll system according to claim 1 or 2, wherein said means for selectively connecting said hydraulic pressure reaction chamber with said damper means comprises a switching valve disposed between said reaction chamber and said damper means so as to supply the hydraulic pressure in said reaction chamber selectively into the damper means on the right-hand side of the vehicle or the damper means on the left-hand side of the vehicle depending on said selected steering direction.

8. An anti-roll system according to claim 1 or 2, wherein said system further includes a proportional valve disposed between said reaction chamber and said damper means, for controlling the hydraulic pressure led from said reaction chamber to supply a hydraulic pressure which is in a predetermined proportional relation to the pressure in said reaction chamber, from a source of hydraulic pressure to said damper means.

* * * * *